United States Patent
Singh

(10) Patent No.: US 12,388,707 B2
(45) Date of Patent: Aug. 12, 2025

(54) CUSTOMIZATION OF NON-CONFIGURED USER EQUIPMENT

(71) Applicant: Charter Communications Operating, LLC, St. Louis, MO (US)

(72) Inventor: Lakhbir Singh, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/229,800

(22) Filed: Aug. 3, 2023

(65) Prior Publication Data

US 2025/0047555 A1 Feb. 6, 2025

(51) Int. Cl.
| | |
|---|---|
| *G06F 15/177* | (2006.01) |
| *G06F 8/61* | (2018.01) |
| *H04L 41/0803* | (2022.01) |
| *H04W 48/16* | (2009.01) |
| *H04W 48/18* | (2009.01) |

(52) U.S. Cl.
CPC ............ *H04L 41/0803* (2013.01); *G06F 8/61* (2013.01); *H04W 48/16* (2013.01); *H04W 48/18* (2013.01)

(58) Field of Classification Search
None
See application file for complete search history.

(56) References Cited

U.S. PATENT DOCUMENTS

2014/0157255 A1* 6/2014 Chan .................. G06F 8/61
717/177

* cited by examiner

*Primary Examiner* — Wing F Chan
*Assistant Examiner* — Andrew Woo
(74) *Attorney, Agent, or Firm* — Armis IP Law, LLC

(57) ABSTRACT

As discussed herein, in response to detecting absence of an operating system installed on the mobile communication device, communication management hardware of a mobile communication device establishes a wireless communication link between the mobile communication device and a remote management entity. The communication device communicates attributes of the mobile communication device over the wireless communication link to the management entity. Based on the attributes, the mobile communication device receives identities of multiple operating systems available for retrieval and installation onto the mobile communication device.

29 Claims, 12 Drawing Sheets

CUSTOMIZATION OF NON-CONFIGURED USER EQUIPMENT

BACKGROUND

There are many different types of mobile communication devices available from different manufacturers. Each manufacturer requires installation of their own operating system on a respective mobile communication device to support functionality of that manufacturer's mobile communication device.

In addition to requiring implementation of an appropriate operating system, a mobile communication device also needs to be configured with subscriber identity module information. A subscriber identity module or subscriber identification module (SIM), also known a SIM card or SIM information, is an integrated circuit that is used to securely store information such as the international mobile subscriber identity (IMSI) telephony number and its related key information. Such information is used to identify and authenticate subscribers of mobile communication devices when they attempt to use a respective wireless network operated by a service provider associated with the SIM information.

Conventional SIM information typically includes subscriber information such as a unique serial number (ICCID), international mobile subscriber identity (IMSI) number, security authentication and ciphering information, temporary information related to the local network, a list of the services the user has access to, and two passwords such as a personal identification number (PIN) for ordinary use, and a personal unblocking key (PUK) for PIN unlocking.

It may be noted that newer technology supports so-called embedded SIM information. An embedded-SIM (eSIM) or embedded universal integrated circuit card (eUICC) is a form of programmable SIM card that is embedded directly into a mobile communication device.

BRIEF DESCRIPTION OF EMBODIMENTS

This disclosure includes the observation that there are deficiencies associated with conventional mobile communication devices. For example, as previously discussed, operation of a mobile communication device requires installation of a corresponding manufacturer's operating system. That is, an Apple™ mobile communication device must execute an Apple™ operating system; a Samsung™ mobile communication device must execute a Samsung™ operating system; and so on. Mobile communication devices configured to support only a single specific operating system lack flexibility because a respective user may prefer one manufacturer's operating system over another.

It is further observed that different manufacturer's mobile communication devices typically include similar functionality such as a microphone to detect sound, a speaker to output sound, buttons to control sound or power, a display screen, etc. As further discussed herein, a proposed unique mobile communication device supports installation and execution of multiple different operating systems as well as unique configuration of a respective mobile communication device. In other words, the mobile communication device supports execution of any of multiple different operating systems from multiple different corresponding vendors/manufacturers.

More specifically, as discussed herein, a non-configured mobile communication device establishes a wireless communication link between the mobile communication device and a remote management entity. The communication device communicates attributes of the mobile communication device over the wireless communication link to the management entity. Based on the attributes, the mobile communication device receives identities of multiple operating systems available for retrieval and installation onto the mobile communication device.

In accordance with one example, the mobile communication device communicates the attributes of the mobile communication device over the wireless communication link to the remote management entity in response to detecting absence of an operating system installed on the mobile communication device or a desire to change a current operating system installed on the mobile communication device. Additionally, or alternatively, the mobile communication device can be configured to communicate the attributes in response to a user of the mobile communication device attempting to configure or re-configure it.

In accordance with further examples, the communication management resource of the mobile communication device can be configured to present (display) the received identities on a display screen of the mobile communication device for selection by a user of the mobile communication device.

Yet further, as discussed herein, in response to selection of a first operating system from the identities of the displayed multiple operating systems, the communication management hardware associated with the mobile communication device communicates an identity of the selected first operating system over the wireless communication link to the remote configuration management entity. In response to communicating the identity of the selected first operating system to the management entity, the communication management hardware receives a download of the first operating system over the wireless communication link from the configuration management entity or other suitable entity. The communication management hardware installs the first operating system onto the mobile communication device for subsequent execution.

In still further examples, subsequent to installation of a first operating system on the mobile communication device via communications received over the wireless communication link, the mobile communication device scans for presence (availability) of one or more wireless networks supported by the first operating system installed on the mobile communication device. In one instance, scanning for presence of wireless networks results in the mobile communication device detecting identities of multiple different wireless network service providers supporting the first operating system.

Yet further, the mobile communication device can be configured to receive selection of a first wireless network service provider amongst the multiple available wireless network service providers detected in an area. The communication management hardware of the mobile communication device communicates the selection of the wireless network service provider over the wireless communication link to the remote management entity or other suitable entity. In response to communicating the selection, the communication management hardware receives configuration information over the wireless communication link. The configuration information supports communications between the mobile communication device and wireless access points operated by the selected first wireless network service provider.

In accordance with further examples, the configuration information can be configured to include subscriber identity information (such as SIM information) for installation on the mobile communication device. Installation of the subscriber identity information (such as SIM information) on the mobile communication device supports wireless connectivity of the mobile communication device to one or more wireless access points operated by the selected first wireless network service provider.

Yet further, the configuration information may include antenna settings for application to antenna hardware of the mobile communication device. Installation and subsequent implementation of the antenna settings on the mobile communication device supports wireless connectivity of the antenna hardware of the mobile communication device to the wireless access points operated by the first wireless network service provider.

Note further that, subsequent to selection of a first operating system from the identities and installation of the first operating system onto the mobile communication device, the mobile communication device can be configured to receive a first command from the user. Assume that the first command indicates to remove the first operating system from the mobile communication device. In response to receiving the first command, the mobile communication device removes the first operating system from the mobile communication device. In response to selection of a second operating system from the identities of multiple available operating systems, the mobile communication device receives a download of the second operating system at the mobile communication device. The communication management hardware of the mobile communication device installs the second operating system onto the mobile communication device.

Accordingly, techniques herein are useful over conventional techniques. For example, embodiments herein provide a unique way to install one of multiple different operating system to operate a respective mobile communication device. More specifically, examples as discussed herein enable a respective user to initially configure a new mobile communication device and potentially reconfigure the mobile communication device if they wish to switchover to use of a different operating system and or different wireless network service provider. In other words, the mobile communication device from a single manufacturer can be configured for use on multiple different wireless networks.

Note that any of the resources as discussed herein can include one or more computerized devices, user equipment, wireless communication devices, gateway resources, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other examples herein include software programs to perform the steps and/or operations summarized above and disclosed in detail below. One such embodiment comprises a computer program product including a non-transitory computer-readable storage medium or any computer readable storage hardware on which software instructions are encoded/stored for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium or any computer readable storage hardware such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One example as discussed herein includes a computer readable storage medium and/or computer-readable storage hardware having instructions stored thereon to support wireless communications using eSIM information. The instructions, when executed by the computer processor hardware, cause the computer processor hardware (such as one or more co-located or disparately processor devices or hardware) to: establish a wireless communication link between a mobile communication device and a remote management entity; communicate attributes of the mobile communication device over the wireless communication link to the remote management entity; and in response to communicating the attributes, receive identities of multiple operating systems available for retrieval and installation onto the mobile communication device.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting configuration of mobile communication devices in a wireless network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

Figure 1:
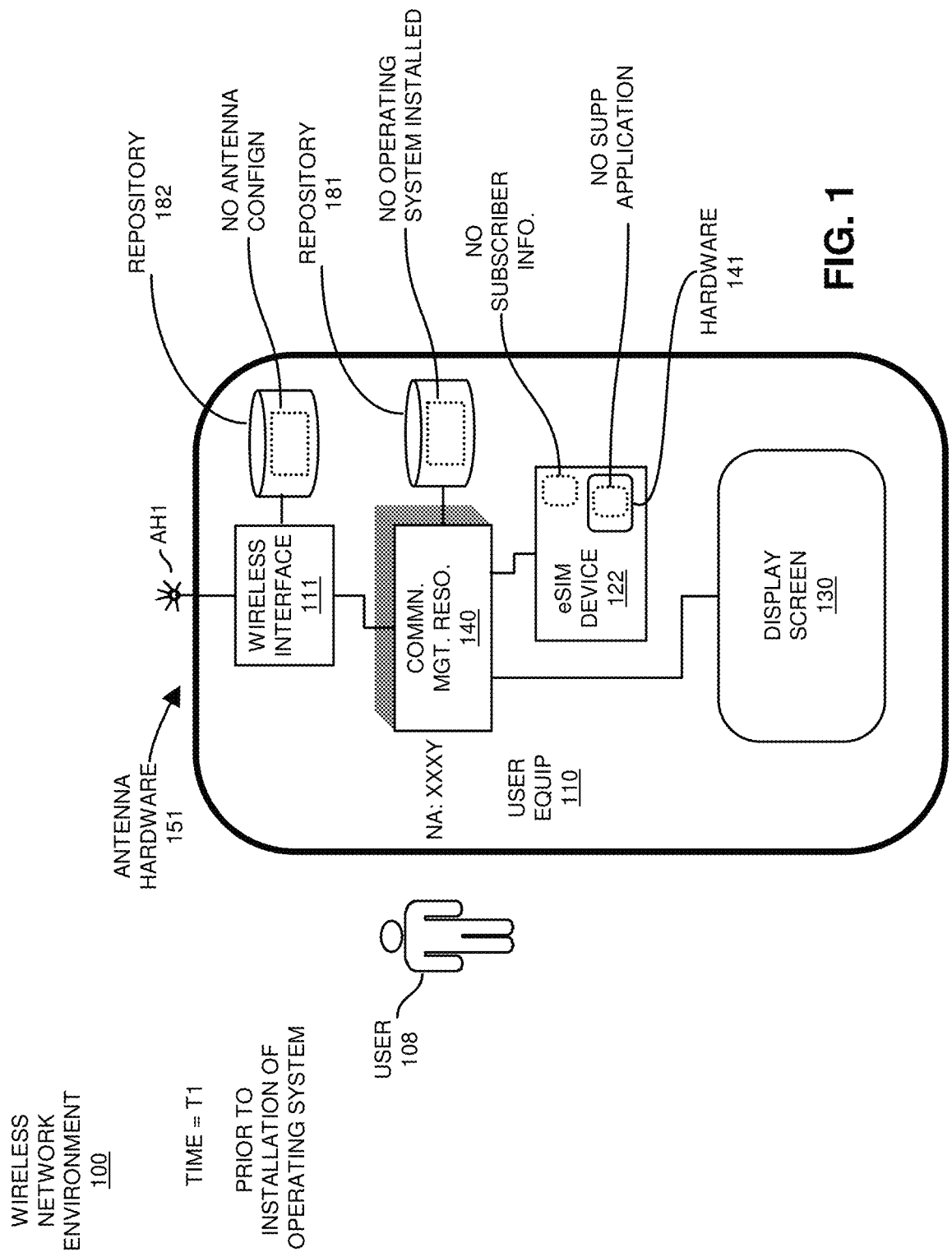
FIG. 1 is an example diagram illustrating user equipment supporting novel configuration of a mobile phone communication device (user equipment) as discussed herein.

The foregoing and other objects, features, and advantages of the invention(s) will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Communication management hardware of a mobile communication device establishes a wireless communication link between the mobile communication device and a remote management entity. The wireless communication link may be established by the mobile communication device in response to detecting absence of an operating system installed on the mobile communication device and/or one or more other conditions such as a user powering a respective mobile communication device, input of a command to the mobile communication device to configure or re-configure the mobile communication device, and so on. In furtherance of configuring the mobile communication device, the communication device communicates attributes (such as one or more of manufacturer, model, version, etc.) of the mobile communication device over the wireless communication link to the management entity. Based on the received attributes, the mobile communication device receives identities of multiple operating systems available for retrieval and installation onto the mobile communication device.

The user of the mobile communication device or other suitable entity selects an appropriate operating system for installation.

Now, more specifically, FIG. 1 is an example diagram illustrating user equipment supporting novel configuration of a mobile communication device (user equipment) as discussed herein.

As shown in this example, the wireless network environment 100 includes user equipment 110 operated by user 108. The user equipment 110 (such as a mobile communication device, mobile phone device, etc.) as shown in FIG. 1 may be a new device that has not yet been configured with a respective operating system to execute applications and support different functions associated with the user equipment 110. The user equipment 110 as shown in FIG. 1 may be a new device that has not yet been configured with any applications, SIM information supporting wireless connectivity for a particular wireless network service provider, antenna hardware configuration information to support wireless connectivity with a selected wireless network service provider, and so on.

Further in this example, user equipment 110 includes wireless interface 111 associated with antenna hardware AH1, communication management resource 140, eSIM device 122 for storing SIM (Subscriber Identity Module) information, and display screen 130.

Repository 181 is present on the user equipment 110 to store a respective operating system selected by the user 108 or other suitable entity. Repository 182 is present on the user equipment 110 to store configuration information associated with the antenna hardware 151 such as including one or more of antenna hardware AH1 and corresponding wireless interface 111.

In this example, the eSIM device 122 (or alternatively standard SIM hardware supporting insertion of a physical SIM card) includes programmable hardware 141 to execute one or more supplemental applications (not yet installed in hardware 141 of FIG. 1) associated with the subscriber identity module information. In other words, the eSIM device 122 can be configured to support download and execution of one or more supplemental applications associated with the SIM functionality supported by the eSIM device 122.

Note that each of the different components as discussed herein such as communication management resource 140, wireless interface 111, eSIM device 122 (resource), mobile communication device such as user equipment 110, etc., can be implemented via hardware, software, or a combination of both hardware and software.

More specifically, communication management resource 140 can be configured to include communication management hardware, communication management software, or a combination of communication manager hardware and communication management software; wireless interface 111 can be configured to include wireless interface hardware, wireless interface software, or a combination of wireless interface hardware and wireless interface software; eSIM resource (such as eSIM device 122) can be configured to include communication management hardware, communication management software, or a combination of communication manager hardware and communication management software; and so on.

As further shown, the user equipment 110 (such as a new phone device) at or around time T1 has not yet been configured with appropriate information to support connectivity with a respective wireless network. For example, the user equipment 110 has not yet been configured with an appropriate operating system stored in repository 181; the user equipment 110 has not yet been configured with appropriate antenna configuration information stored in repository 182; the user equipment 110 has not yet been configured with appropriate subscriber identity module information in a respective repository of eSIM device 122; and so on. The following drawings and text describe how a respective user configures the user equipment 110.

Figure 2:
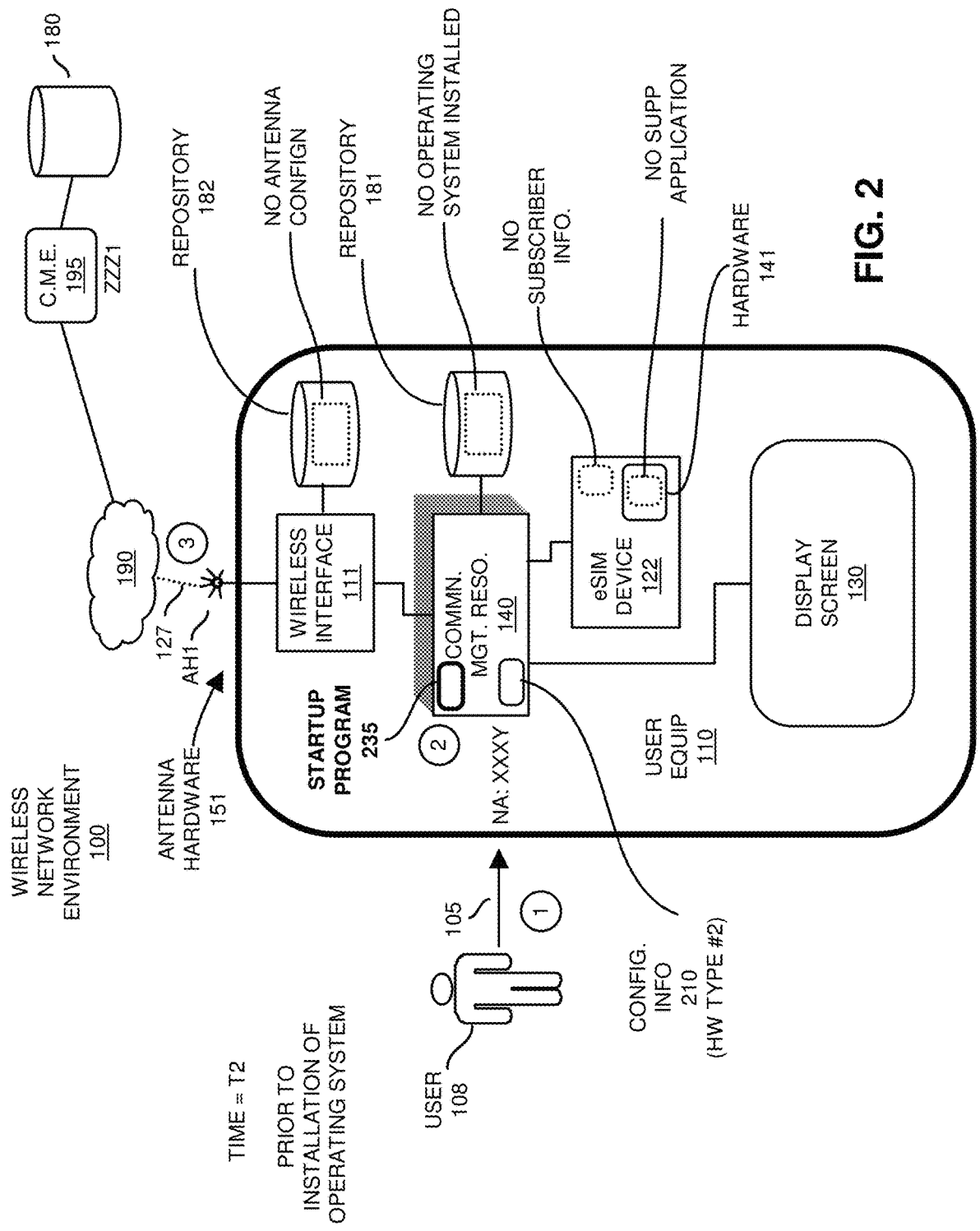
FIG. 2 is an example diagram illustrating implementation of an initializer program to configure a respective new, non-configured mobile communication device as discussed herein.

FIG. 2 is an example diagram illustrating implementation of an initializer program (startup program) to configure a respective new mobile communication device as discussed herein.

At or around time T2, the user 108 receives the user equipment 110, which is in a new, non-configured state. For example, the user equipment 110 has not yet been configured with an operating system, SIM information, application information, etc., as previously discussed.

In order to configure the corresponding user equipment 110, in processing operation #1, the user 108 provides input 105 (such as credentials including username and password or other input) to the user equipment 110. The input 105 may include powering up of the corresponding user equipment 110 (a.k.a., mobile communication device). In one example, powering up of the user equipment 110 in the non-configured state causes the communication management resource 140 to initiate execution of the startup program 235 in processing operation #2. Additionally, or alternatively, receipt of a command (via input 105) from the user 108 indicating to configure the user equipment 110 results in activation of the corresponding startup program 235 (such as an initializer program) associated with the communication management resource 140 in processing operation #2.

The executed startup program 235 supports basic functions enabling the corresponding user equipment 110 to be configured prior to installation of a respective operating system in repository 181. In other words, because the user equipment 110 has not yet been configured with a corresponding operating system stored in the repository 181, the executed startup program 235 (in accordance with input 105) enables the user equipment 110 to perform basic functions (establishment of a wireless communication link, communications of commands/requests, retrieval of data, and so on) as further discussed herein.

As further shown, in processing operation #3, in response to execution of the starter program 235, and potentially the user 108 providing input requesting configuration of the user equipment 110, the communication management resource 140 controls operation of the wireless interface 111 to establish a corresponding wireless communication link 127 between the antenna hardware AH1 of the user equipment 110 and a corresponding wireless access point in the network 190.

Note that the wireless communication link 127 can be established in support wireless communications in accordance with any suitable wireless communication protocol such as Wi-Fi™, Long Term Evolution, 3G, 4G, 5G, . . . , New Radio, and so on. Because there is no SIM information installed in eSIM device 122, the user equipment 110 may establish the corresponding wireless communication link 127 and corresponding connectivity with the wireless network and wireless access point via Wi-Fi™.

In this example, the user equipment 110 is assigned network address XXXY; the communication management entity 195 is assigned network address ZZZ1 for routing of communications.

As further discussed herein, via communications (source network address=XXXY and destination=ZZZ1) over the wireless communication link 127 from the antenna hardware AH1 of the user equipment 110, the communication management resource 140 communicates and establishes connectivity with the communication management entity 195 such as a server resource. Accordingly, examples herein include establishing a wireless communication link 127 between the user equipment 110 (mobile communication device) and a management entity 195 to configure user equipment 110.

In this example, the communication management entity 195 manages distribution of operating systems for use by each of multiple mobile communication devices in the network environment 100 when requested by those corresponding communication devices.

Figure 3:
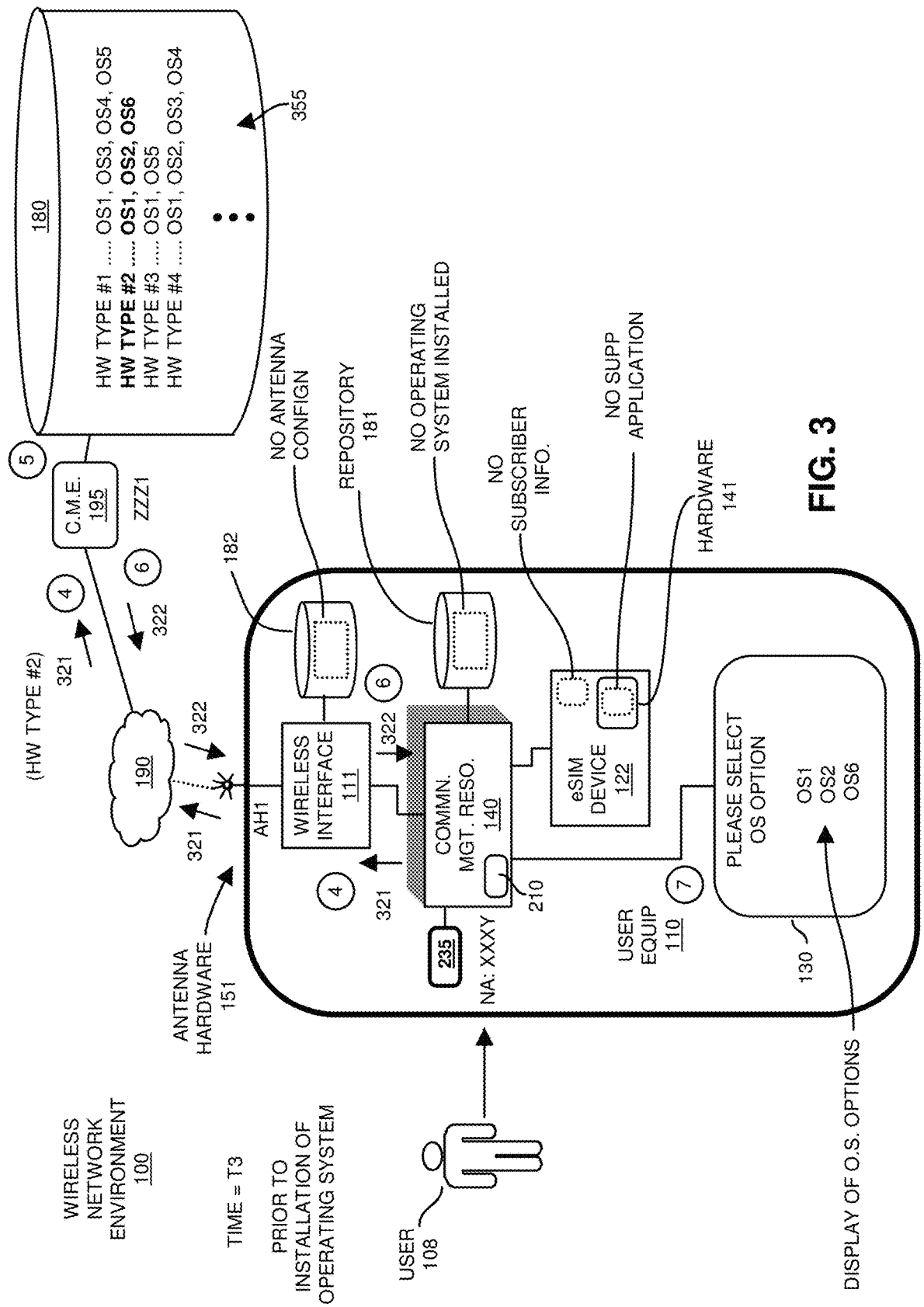
FIG. 3 is an example diagram illustrating display of selectable operating systems for download and installation on a mobile communication device as discussed herein.

FIG. 3 is an example diagram illustrating display of selectable operating systems for download and installation on a mobile communication device as discussed herein.

In processing operation #4, in furtherance of configuring the user equipment 110 as requested by the user 108, the communication management resource 140 retrieves attributes such as configuration information 210 (including information such as attributes of the user equipment 110 being HARDWARE-TYPE #2). In this example, the information HARDWARE-TYPE #2 (a.k.a., HW-TYPE #2) communicated in communications 321 can be configured to indicate any information such as a manufacturer of the user equipment 110, model of the user equipment 110, version of the user equipment 110, and so on.

Further, in processing operation #4, via communications 321, the communication management resource 140 communicates attributes (a.k.a., HW-TYPE #2) of the user equipment 110 over the wireless communication link and network 190 to the management entity 195. As previously discussed, the communications 321 can be configured to include the network address ZZZ1 assigned to the communication management entity 195. The network 190 routes the communications 321 to the communication management entity 195 based upon the destination network address ZZZ1 in the communications 321.

In accordance with one implementation, the communication management resource 140 (and corresponding executed startup program 235) initiates transmission of the communication 321 to the communication management in 195 in response to detecting a condition such as absence of an operating system being installed on the user equipment 110 in repository 181. In other words, the communication management resource 140 can be configured to first execute an operating system in the repository 181 to support functionality associated with the user equipment 110. If the operating system has not yet been installed on the user equipment 110, the communication management resource 140 reverts to execution of the startup program 235 and providing notification on the display screen 130 to the user 108 that the user equipment 110 can be configured with an operating system.

Note further that the startup program 235 may include boot capabilities in which the execution of the starter program 235 loads any operating system for execution by the communication management resource 140 upon power up of the user equipment 110. As previously discussed, because no operating system has been installed on the user equipment 110 at or around time T1, the communication management resource 140 executes the startup program 235.

In processing operation #5, and in response to receiving the communications 321 and corresponding notification that the user equipment 110 assigned the network address XXXY is of the type=HARDWARE TYPE #2, via mapping information 355, the communication management entity 195 maps the received configuration information HW-TYPE #2 to one or more different operating systems (such as operating system OS1, OS2, and OS6) supported by the corresponding make, model version, etc., of the user equipment 110.

In processing operation #6, via communications 322 (such as including destination=network address XXXY) from the communication management entity 195 to the communication management resource 140, the communication management entity 195 provides notification to the communication management resource 140 of the identities of the operating systems OS1, OS2, and OS6 to the communication management resource 140 and user equipment 110. The network 190 routes communications 322 to the communication management resource 140 via network address XXXY (destination network address).

Accordingly, based on the retrieved and communicated attributes of the user equipment 110, the communication management resource 140 and corresponding user equipment 110 receives identities of multiple operating systems OS1, OS2, and OS6 available for retrieval and installation onto the user equipment 110.

As further shown, in processing operation #7, in accordance with the communications 322, the communication management resource 140 presents (i.e., displays) the received identities of available operating systems OS1, OS2, and OS6 on a display screen 130 of the user equipment 110 for selection by the user 108 of the user equipment 108. Additionally, or alternatively, the communication management resource 140 can be configured to select an appropriate operating system to install without displaying the operating system options and receiving input from the respective user 108.

Figure 4:
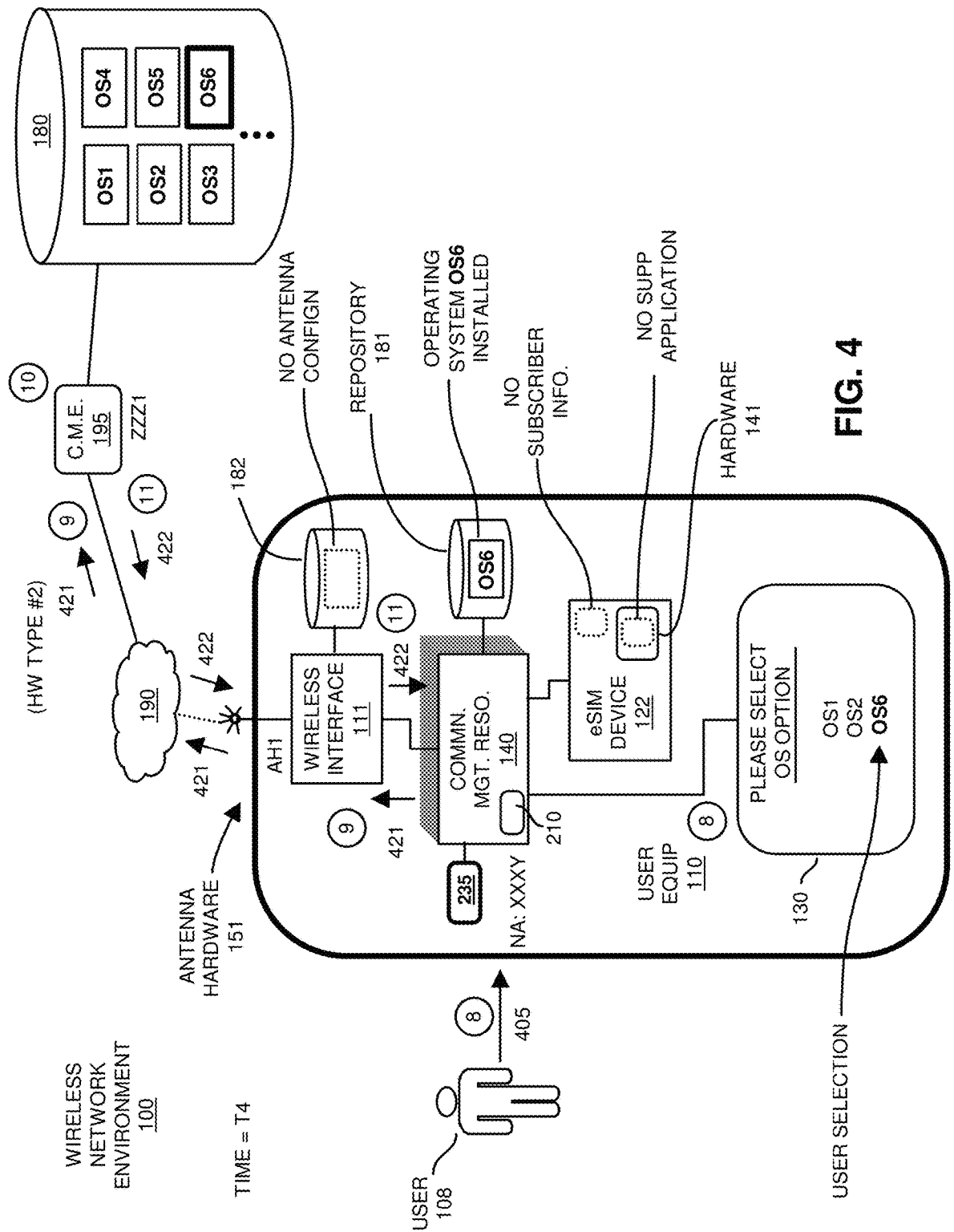
FIG. 4 is an example diagram illustrating selection, downloading, and installation of an operating system on a mobile communication device as discussed herein.

FIG. 4 is an example diagram illustrating selection and downloading and installation of a selected operating system on a mobile communication device as discussed herein.

In processing operation #8, at or around time T4, via input 405 from user 108 to the user equipment 110 and corresponding communication management resource 140, the user 108 or other suitable entity provides selection of operating system OS6 on the display screen 130.

In response to selection of the operating system OS6 from the identities of the multiple operating systems on display screen 130 as indicated by input 405, in processing operation #9, the communication management resource 140 communicates an identity of the selected operating system OS6 over the wireless communication link 127 to the management entity 195 via communications 421. This notifies the communication management entity 195 that the repository 180 is to be populated with the operating system OS6 for execution by the communication management resource 140.

In processing operation #10, to accommodate the request for operating system OS6, the communication management entity 195 retrieves the operating system OS6 for processing and transmission to the user equipment 110 in a reverse direction in communications 422.

Accordingly, in response to communicating the identity of the selected operating system OS6 to the management entity 195 in communications 421, the communication management resource 140 and corresponding user equipment 110 receive a download of the operating system OS6 over network 190 and the wireless communication link 127 via communications 422. The communication management resource 140 (via executed startup program 235) installs the received operating system OS6 (software instructions, data, etc.) onto the user equipment 110 (mobile communication device) in processing operation #11 for subsequent execution by the communication management resource 140.

Note that the communications 422 may further indicate one or more specific wireless network service providers associated with or supported by the operating system OS6 selected by the user 108 or other suitable entity.

Figure 5:
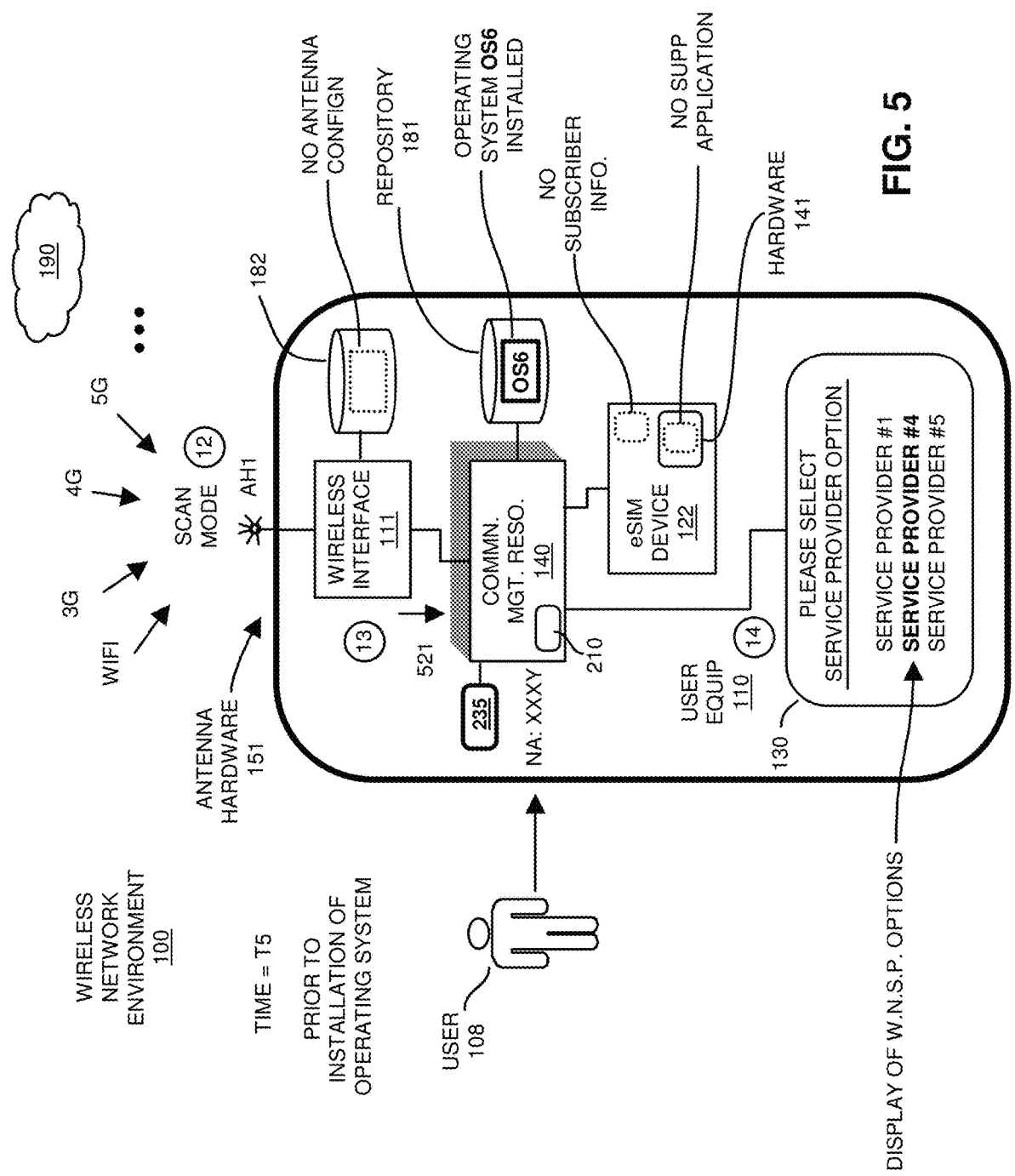
FIG. 5 is an example diagram illustrating scanning of wireless networks to learn of available wireless services and corresponding wireless network service providers as described herein.

FIG. 5 is an example diagram illustrating scanning of wireless networks to learn of available wireless services as described herein.

In processing operation #12, subsequent to installing the first operating system OS6 (such as stored in repository 181) on the user equipment 110 via communications received over the wireless communication link 127, the communication management resource 140 initiates scanning (from antenna hardware AH1) for presence of wireless networks and corresponding wireless access points supported by the selected operating system OS6.

For example, in response to the scanning of different carrier frequencies, different wireless communication protocols (such as Wi-Fi™, 3G, 4G, 5G, . . . , NR, etc.), etc., in processing operation #13, the communication management resource 140 detects identities of multiple different wireless network service providers supported by the selected operating system OS6. As previously discussed, communications 422 may further indicate one or more specific wireless network service providers associated with or supported by the operating system OS6 selected by the user 108 or other suitable entity. The user equipment 110 can be configured to scan for presence of any of the specified service provider's wireless networks supported by the operating system OS6. Additionally, or alternatively, the user equipment 110 can be configured to scan for any available wireless network service providers.

In response to the scanning in processing operation #13, assume that the communication management resource 140 detects availability of wireless networks associated with multiple service providers such as wireless network service provider #1, wireless network service provider #4, and wireless network service provider #5.

In processing operation #14, the communication management resource 140 displays identities of the detected available wireless network service providers on the display screen 130 for selection by the corresponding user 108 or other suitable entity associated with the user equipment 110. The executed startup program 235 can be configured to filter detected wireless network service providers such that the displayed identities on display screen 130 indicate only wireless networks and service providers supporting operating system OS6.

Figure 6:
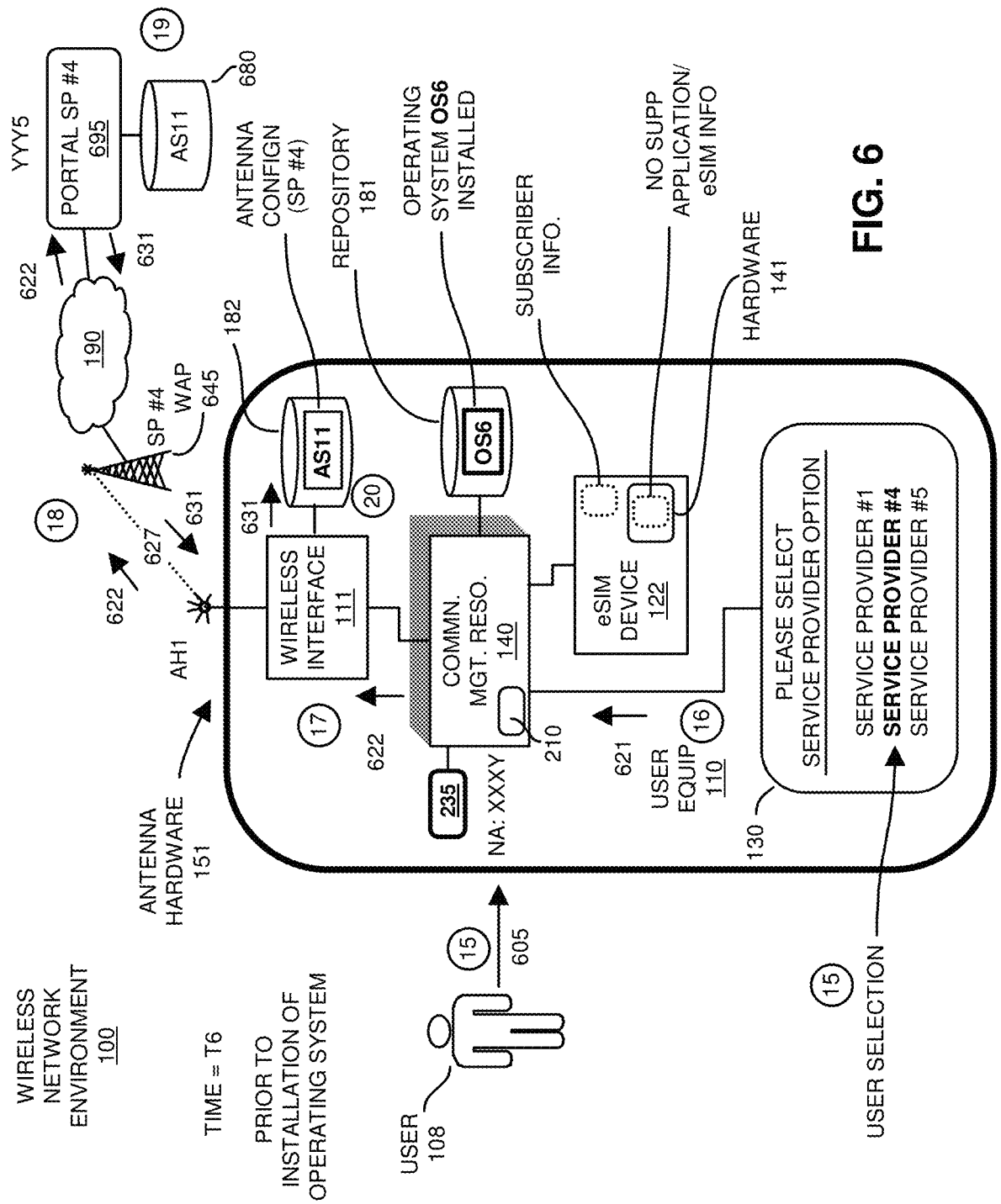
FIG. 6 is an example diagram illustrating display of identities of available wireless network service providers and selection of a respective service provider to support wireless connectivity with a wireless network as described herein.

FIG. 6 is an example diagram illustrating display of identities of available wireless network service providers and selection of a respective service provider to support connectivity with a wireless network as described herein.

In processing operation #15, the communication management resource 140 receives input 605 indicating selection of the wireless network service provider #4. In processing operation #16, the communication management resource 140 receives notification of the selection of wireless network service provider #4 amongst the multiple wireless network service providers displayed in display screen 130.

The selection of the wireless network service provider #4 prompts the communication management resource 140 (such as executing corresponding startup program 235 or operating system OS6) to determine a respective network address of a corresponding portal 695 supported by the selected wireless network service provider #4.

In this example, the communication management resource 140 determines the portal 695 (network address YYY5) is used for signing up the user 108 and corresponding user equipment 110 to use the wireless services by the selected wireless network service provider #4. In such an instance, in furtherance of the user equipment 110 signing up to use wireless services provided by the wireless network service provider #4, the communication management resource 140 transmits communications 622 (destination=YYY5) over the wireless communication link 627 through the network 190 to the corresponding wireless network portal 695 associated with service provider #4 having assigned network address YYY5.

Note that, in furtherance of signing up the corresponding user 108 and user equipment 110 for use of wireless services, the communication management resource 140 can be configured to forward information such as hardware type HW-TYPE #2 to the portal 695. The portal 695 can be configured to use this information as a basis for determining appropriate antenna hardware configuration information that supports subsequent wireless communications between the antenna hardware AH1 and the wireless base stations (wireless access points) in network 190 operated by the selected wireless network service provider #4.

Thus, in processing operation #18, via further communications 622 transmitted from the communication management resource 140 to the wireless network service provider portal 695, the user 108 and/or corresponding communication management resource 140 provides appropriate information to the portal 695 associated with service provider #4 to sign up the user equipment 110 for use of corresponding wireless network services provided by wireless network service provider #4.

Further in processing operation #19, via communications 631, the portal 695 retrieves and forwards the retrieved antenna hardware configuration information AS11 (such as notification of carrier frequencies, power levels, etc.) for use by the user equipment 110. The configuration information AS11 enables the user equipment 110 to communicate wireless access points (such as wireless base stations) operated by the wireless network service provider #4 in network 190. Such wireless access points provide the user equipment 110 wireless access to remote networks such as the Internet.

In processing operation #20, the communication management resource 140 stores the antenna hardware configuration information AS11 in repository 182. The wireless interface 111 applies the antenna hardware configuration information AS11 to antenna hardware 151 to support subsequent wireless connectivity with the wireless access points operated by the wireless network service provider #4.

Thus, in order to use wireless services and corresponding wireless access points in network 190 associated with the wireless network service provider #4, in processing operation #19, the portal 695 associated with service provider #4 retrieves appropriate antenna hardware configuration information AS11 and forwards it to the user equipment 110 for storage in repository 182. As previously discussed, the configuration information AS11 received over the wireless communication link 627, when implemented by the antenna hardware 151, supports communications between the user equipment 110 and wireless access points operated by the selected wireless network service provider #4.

In one example, the configuration information AS11 includes antenna settings for application to antenna hardware 151 (such as identities of carrier frequencies, power levels, etc.) of the user equipment 110 (mobile communication device). Installation of the antenna settings AS11 supports wireless connectivity of the antenna hardware AH1 of the user equipment 110 to the wireless access points operated by the wireless network service provider #4.

Further in this example, note that the user equipment 110 is not yet completely configured to receive wireless network services associated with the wireless network service provider #4. In other words, as further discussed herein, the user equipment 110 needs to be programmed with SIM information in order to use requested wireless network services as further discussed below.

Figure 7:
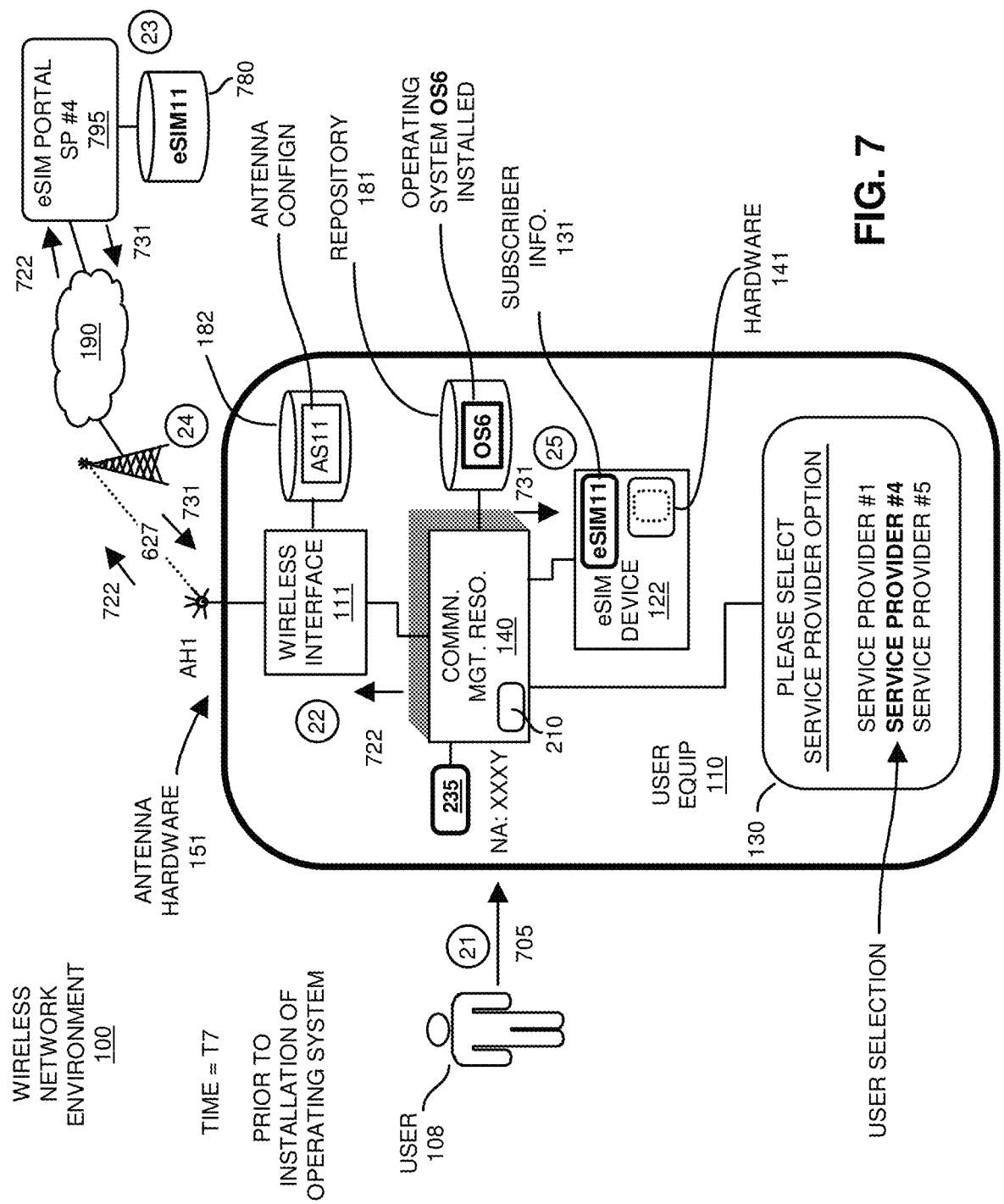
FIG. 7 is an example diagram illustrating retrieval and installation of a respective eSIM onto a mobile communication device to support wireless connectivity as described herein.

FIG. 7 is an example diagram illustrating retrieval and installation of a respective SIM information onto a mobile communication device to support wireless connectivity as described herein.

Via input 705, in processing operation #21, in furtherance of using services provided by the wireless network service provider #4, the user 108 requests retrieval of corresponding subscriber identity module information to install on the user equipment 110.

In response to receiving the input 705 in processing operation #21, the communication management resource 140 transmits communications 722 to the eSIM portal 795 associated with the wireless network service provider #4 in processing operation #22.

In processing operation #23, the portal 795 generates corresponding subscriber identity information eSIM11 for distribution to the corresponding user equipment 110. The SIM information eSIM11 enables the user equipment 110 to use wireless access points associated with the selected wireless network service provider #4.

In processing operation #24, the portal 795 communicates the corresponding scriber information 135 (subscriber identity module information eSIM11) to the communication management resource 140.

In processing operation #25, the communication management resource 140 stores the subscriber identity module information eSIM11 in the eSIM device 122.

In this example, the configuration information (subscriber identity information 131 or eSIM11) includes subscriber identity information for installation on the mobile communication device. Installation of the subscriber identity information eSIM11 on the user equipment 110 supports wireless connectivity of the user equipment 110 via appropriate configuration of antenna hardware AH1 to communicate with the wireless access points operated by the wireless network service provider #4. More specifically, the subscriber information 131 (or eSIM11) can be configured to include information such as authentication credentials (such as one or more encryption keys supporting communications), identity of the corresponding wireless network service provider, subscriber phone number, voicemail number, one or more applets for execution by the eSIM device 122, etc.

Figure 8:
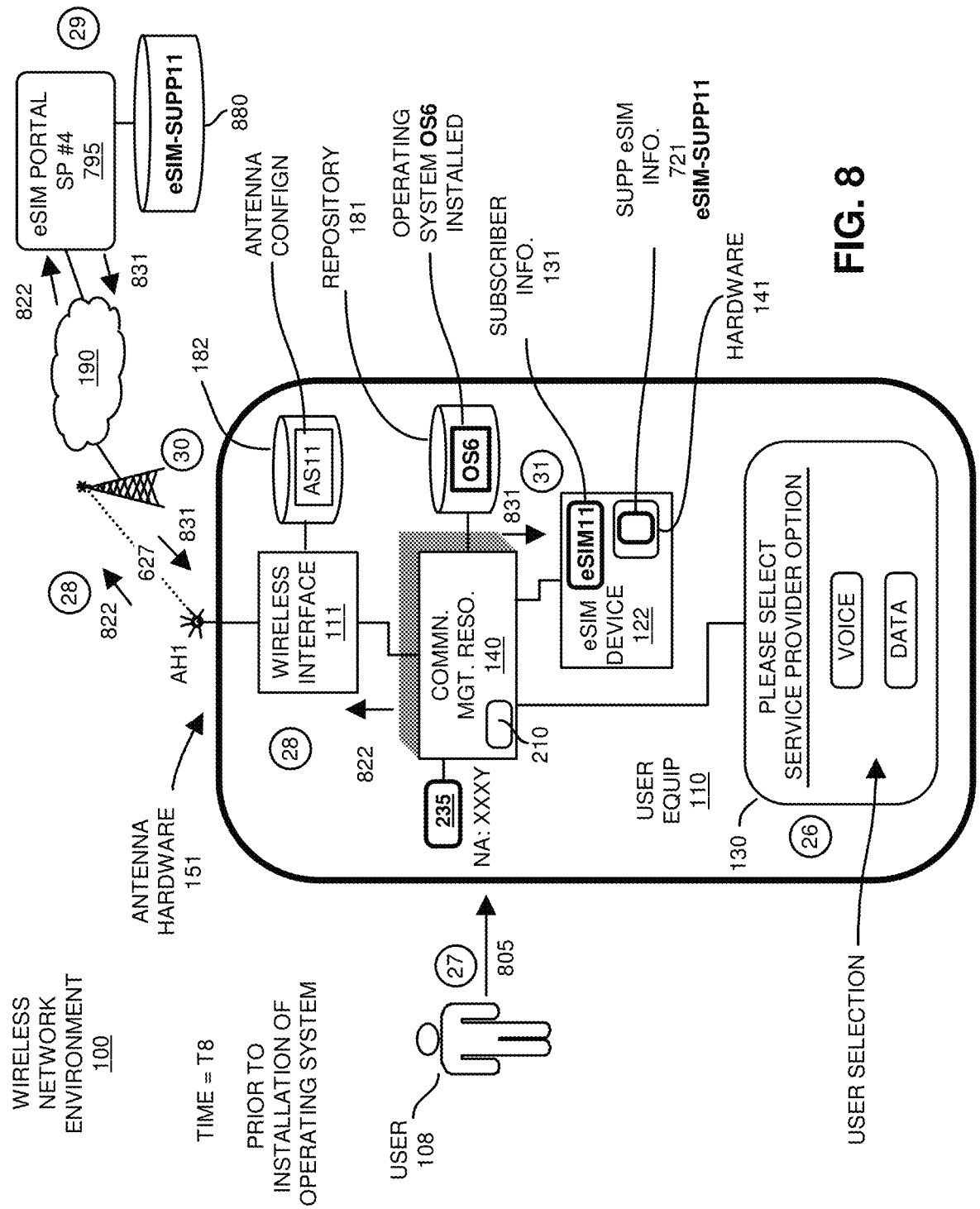
FIG. 8 is an example diagram illustrating selection of different wireless services for a selected wireless network service provider as described herein.

FIG. 8 is an example diagram illustrating selection of different wireless services for a selected wireless network service provider as described herein.

In processing operation #26, the communication management resource 140 receives information from the wireless network service provider #4 and corresponding portal 795 about different possible wireless network service options such as Data and voice plan options selectable by the user 108. The communication management resource 140 initiates display of the selectable options associated with the selected wireless network service provider #4 to the user 108 via display screen 130.

Via input 805, in processing operation #27, in furtherance of using services provided by the wireless network service provider #4, the user 108 requests use of voice and data services. In response to receiving the selection of voice and data services from display screen 130, in processing operation #28, the communication management resource 140 transmits communications 822 to the eSIM portal 795 associated with the wireless network service provider #4. This notifies the portal 795 of selected services voice and data.

In processing operation #29, the portal 795 generates corresponding supplemental subscriber identity information eSIM-SUPP11 (providing support for voice and data options) for distribution to the corresponding user equipment 110.

In processing operation #30, via communications 831, the portal communicates the supplemental subscriber identity module information eSIM-SUPP11 to the communication management resource 140.

In processing operation #31, via communications 831, the communication management resource 140 stores the supplemental subscriber identity module information eSIM-SUPP11 in the hardware 141 associated with the eSIM device 122.

Figure 9:
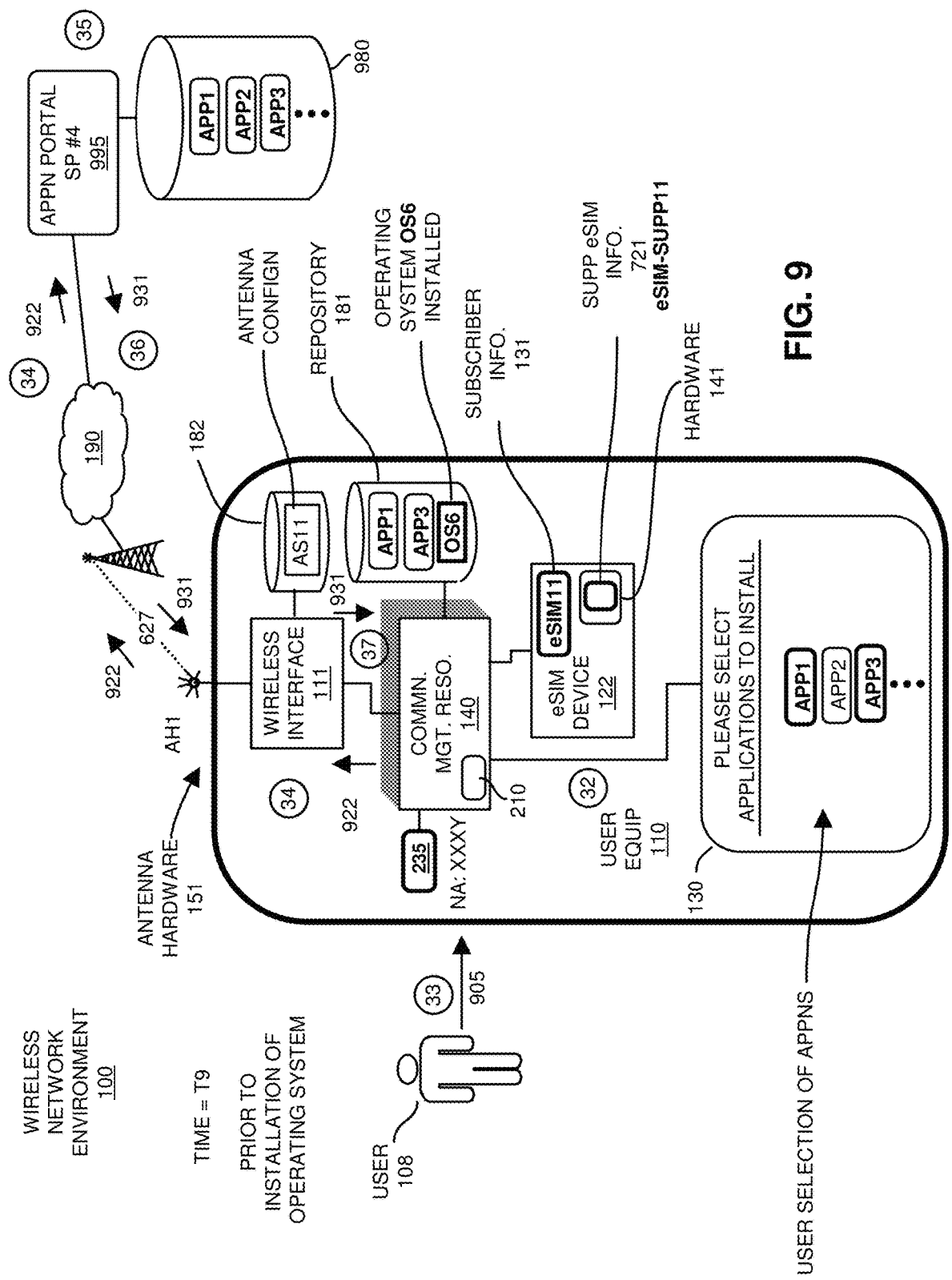
FIG. 9 is an example diagram illustrating display of available applications for installation and download to a corresponding mobile communication device as described herein.

FIG. 9 is an example diagram illustrating display of available applications for installation and download to a corresponding mobile communication device as described herein.

In processing operation #32, the communication management resource 140 is directed to the portal 995 for retrieval and download of possible applications onto the user equipment 110. The communication management resource 140 (executing startup program 235 or operating system OS6) receives information from the wireless network service provider #4 portal 995 or other suitable entity of different available applications (APP1, APP2, APP3, etc.) for downloading to the user equipment 110. The communication management resource 140 initiates display of the selectable application options (APP1, APP2, APP3, etc.) for associated with the selected wireless network service provider #4 to the user 108 via display screen 130.

Via input 905, in processing operation #33, the user 108 selects download of applications APP1 and APP3 onto the user equipment 110. In response to receiving the selection of application APP1 and APP3 from the display screen 130, in processing operation #34, the communication management resource 140 transmits communications 922 to the portal 995 for retrieval of applications APP1 and APP3.

In processing operation #35, the portal 995 retrieves the requested applications APP1 and APP3.

In processing operation #36, via communications 931, the application portal 995 communicates the requested applications APP1 and APP3 to the communication management resource 140.

In processing operation #37, the communication management resource 140 stores and/or installs the received applications APP1 and APP3 on the user equipment 110 such as storage in a repository 181 or other suitable entity.

When executing the operating system OS6, the installed applications can be executed by the operating system OS6.

Note further that, subsequent to selection of the operating system OS6 from the identities of available operating systems and installation of the operating system OS6 onto the mobile communication device, the user equipment 110 may receive a command from the user 108 indicating to remove the first operating system OS6 from the user equipment 110. In response to receiving the command, the communication management resource 140 removes the first operating system OS6 from the user equipment 110.

In a similar manner as previously discussed, the user 108 may select a new operating system for installation on the user equipment 110. For example, the user 108 can provide input to the user equipment 110 and corresponding communication management resource 140 to delete the corresponding operating system OS6 and one or more of the antenna hardware configuration information AS11, eSIM11, applications, etc. Starting again at FIG. 2, the user 108 reconfigure the user equipment 110 a different operating system such as operating system OS2. In such an instance, in response to selection of a second operating system OS2 from the identities of multiple operating systems, the communication management resource 140: i) receives a download of the second operating system OS2, and ii) installs the second operating system OS2 onto the mobile communication device.

Figure 10:
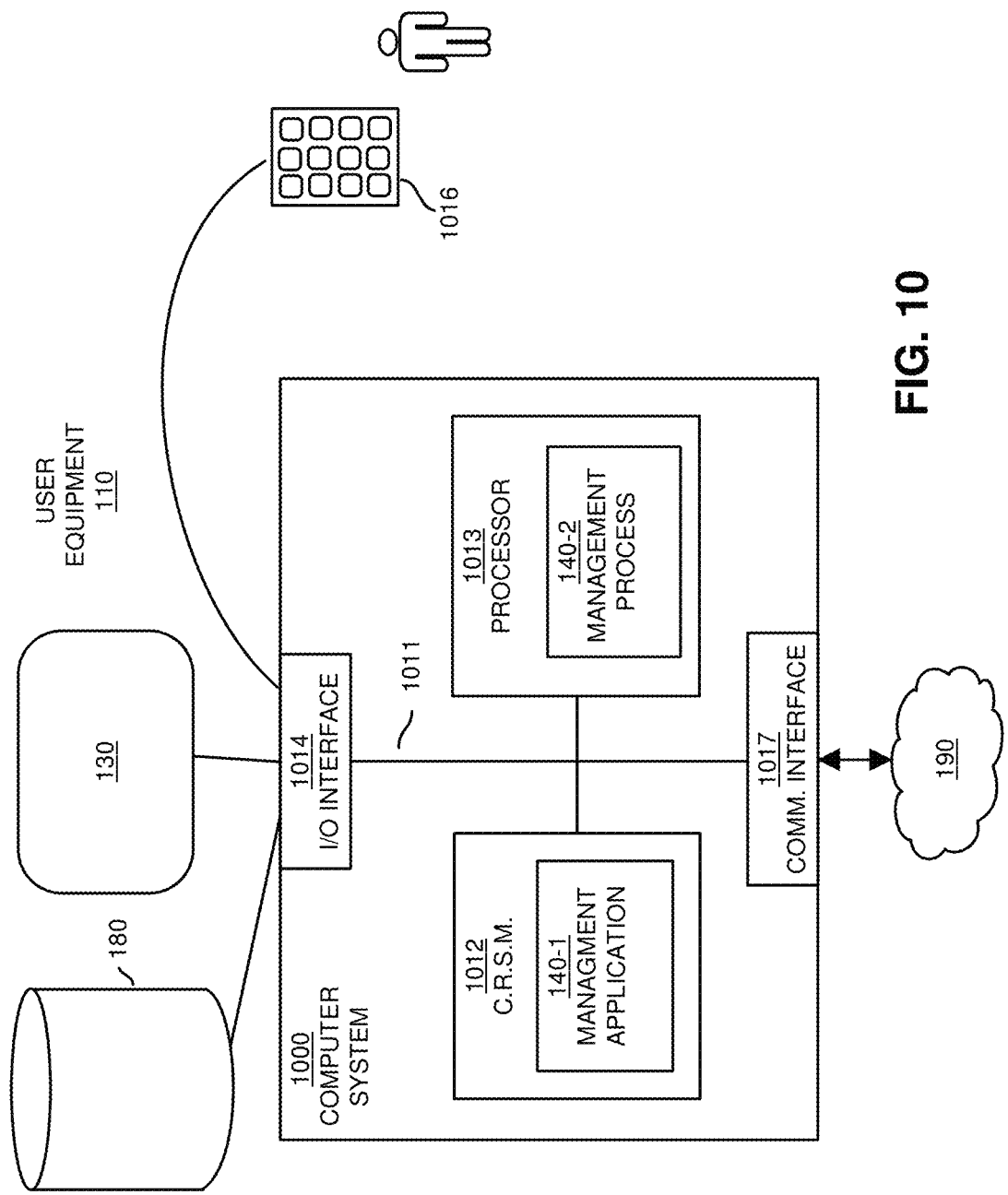
FIG. 10 is an example diagram illustrating example computer architecture operable to execute one or more operations according to embodiments herein.

FIG. 10 is an example block diagram of a computer system for implementing any of the operations as previously discussed according to embodiments herein.

Any of the resources (such as each of one or more wireless communication devices, communication management entity, communication management resource 140, startup program 235, user equipment 110, eSIM device 122, etc.) as discussed herein can be configured to include computer processor hardware and/or corresponding executable (software) instructions to carry out the different operations as discussed herein.

As shown, computer system 1050 of the present example includes an interconnect 1011 coupling computer readable storage media 1012 such as a non-transitory type of media or any suitable type of hardware storage medium in which digital information can be stored and retrieved, a processor 1013 (computer processor hardware), I/O interface 1014, and a communications interface 1017.

I/O interface(s) 1014 supports connectivity to repository 1080 and input resource 1092.

Computer readable storage medium 1012 can be any hardware storage device such as memory, optical storage, hard drive, floppy disk, etc. In one embodiment, the computer readable storage medium 1012 stores instructions and/or data.

As shown, computer readable storage media 1012 can be encoded with management application 140-1 (e.g., including instructions) to carry out any of the operations as discussed herein.

During operation, processor 1013 accesses computer readable storage media 1012 via the use of interconnect 1011 in order to launch, run, execute, interpret or otherwise perform the instructions in in the management application 140-1 stored on computer readable storage medium 1012. Execution of the management application 140-1 produces management process 140-2 to carry out any of the operations and/or processes as discussed herein.

Those skilled in the art will understand that the computer system 1050 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, wireless communication device, gateway resource, communication management resource, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1050 may reside at any location or can be included in any suitable resource in any network environment to implement functionality as discussed herein.

Functionality supported by the different resources will now be discussed via flowchart 1100 (flowchart 1100-1 and flowchart 1100-2) in FIGS. 11 and 12. Note that the steps in the flowcharts below can be executed in any suitable order.

Figure 11:
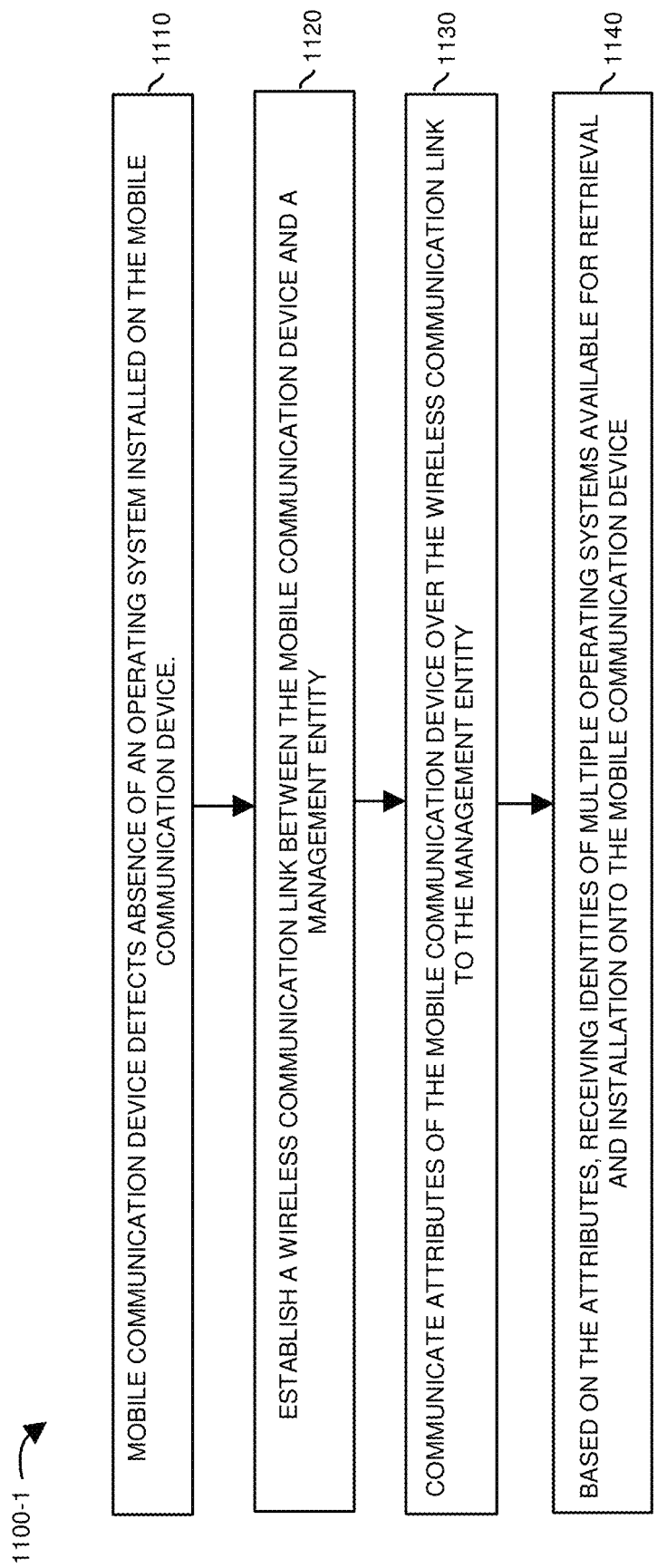
FIGS. 11 and 12 are example diagrams illustrating a method according to embodiments herein.

FIG. 11 is a flowchart 1100-1 illustrating an example method according to embodiments herein. Note that there will be some overlap with respect to concepts as discussed above.

In processing operation 1110, the communication management resource 140 (such as communication management hardware or communication management software) detects absence of an operating system installed on the mobile communication device (user equipment 110).

In processing operation 11020, the communication management resource 140 establishes a wireless communication link between the mobile communication device and a management entity.

In processing operation 1130, the communication management resource 140 communicates attributes of the mobile communication device over the wireless communication link to the management entity.

In processing operation 1140, based on the attributes, the communication management hardware of the mobile communication device receives identities of multiple operating systems available for retrieval and installation onto the mobile communication device.

Figure 12:
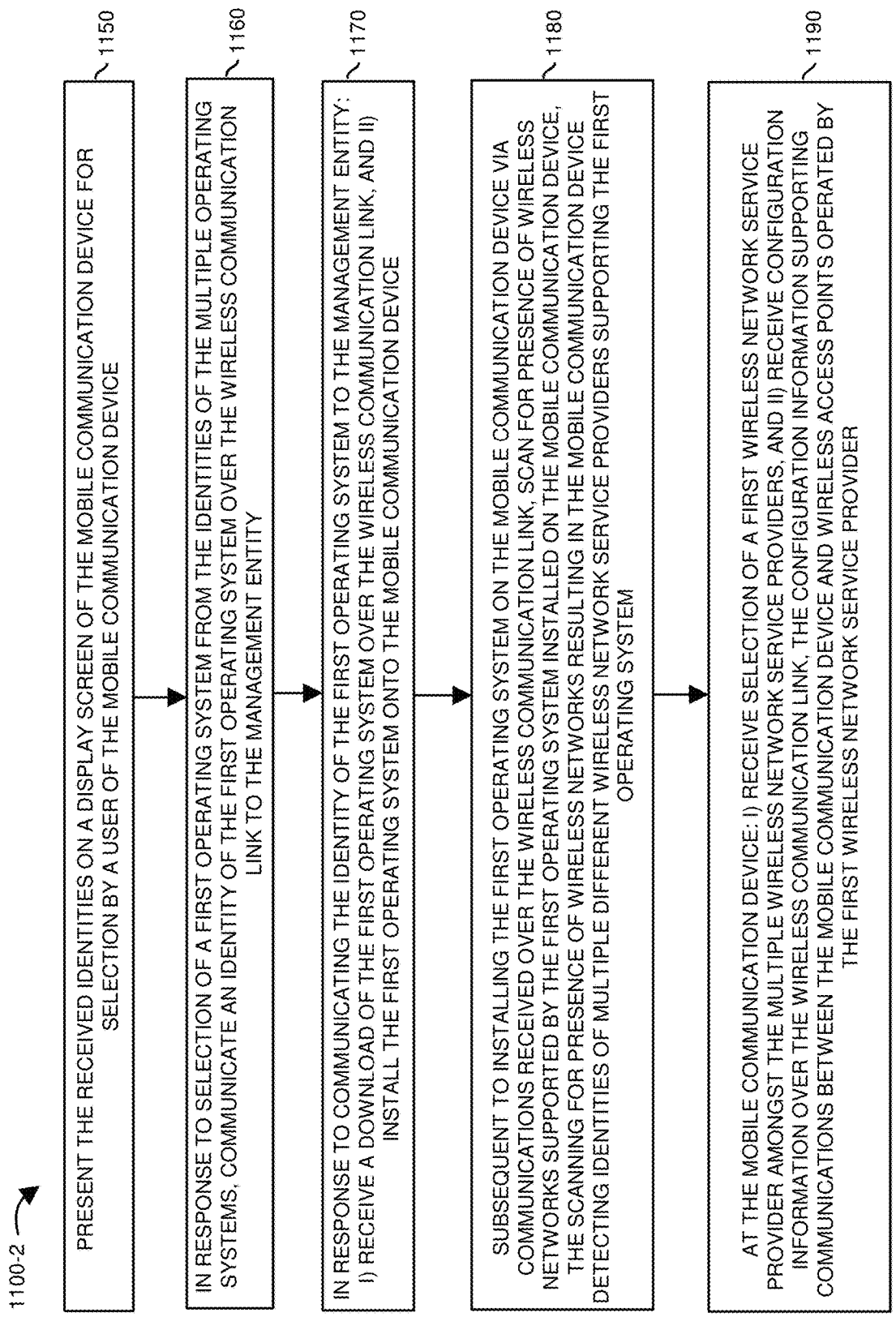

FIG. 12 is a flowchart 1100-2 illustrating an example method according to embodiments herein.

In processing operation 1150 of FIG. 12, the communication management resource of the mobile communication device (i.e., user equipment 110) presents the received identities on a display screen of the mobile communication device for selection by a user of the mobile communication device.

In processing operation 1160, in response to selection of a first operating system from the identities of the multiple operating systems, the communication management resource communicates an identity of the first operating system over the wireless communication link to the management entity.

In processing operation 1170, in response to communicating the identity of the first operating system to the management entity, the communication management resource: i) receives a download of the first operating system over the wireless communication link, and ii) installs the first operating system onto the mobile communication device.

In processing operation 1180, subsequent to installing the first operating system on the mobile communication device via communications received over the wireless communication link, the communication management resource scans for presence of wireless networks supported by the first operating system installed on the mobile communication device. The scanning for presence of wireless networks results in the mobile communication device detecting identities of multiple different wireless network service providers supporting the first operating system.

In processing operation 1190, the mobile communication device: i) receives selection of a first wireless network service provider amongst the multiple wireless network service providers, ii) communicates with a remote communication management entity, and iii) receives configuration information over the wireless communication link.

The configuration information supports communications between the mobile communication device and wireless access points operated by the first wireless network service provider.

Note again that techniques herein are well suited to facilitate wireless communications and configuration of respective one or more instances of user equipment in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing." "calculating." "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
   at a mobile communication device:
   i) establishing a wireless communication link supporting connectivity between the mobile communication device and a management entity;
   ii) communicating attributes of the mobile communication device over the wireless communication link to the management entity in response to detecting absence of any operating system being installed on the mobile communication device, the attributes indicating a hardware type assigned to the mobile communication device; and
   iii) based on the attributes, receiving identities of multiple operating systems available for retrieval and installation onto the mobile communication device.

2. The method as in claim 1 further comprising:
displaying the received identities of the multiple operating systems on a display screen of the mobile communication device for selection by a user of the mobile communication device.

3. The method as in claim 1 further comprising:
in response to selection of a first operating system from the received identities of the multiple operating systems, communicating an identity of the first operating system from the mobile communication device over the wireless communication link to the management entity; and
in response to communicating the identity of the first operating system to the management entity: i) at the mobile communication device, receiving a download of the first operating system over the wireless communication link, and ii) installing the first operating system onto the mobile communication device.

4. The method as in claim 1 further comprising:
subsequent to selection of a first operating system from the identities and installation of the first operating system onto the mobile communication device, receiving a first command from a user of the mobile communication device, the first command indicating to remove the first operating system from the mobile communication device; and
in response to receiving the first command, removing the first operating system from the mobile communication device.

5. The method as in claim 4 further comprising:
in response to selection of a second operating system from the identities of multiple operating systems: i) receiving a download of the second operating system at the mobile communication device, and ii) installing the second operating system onto the mobile communication device.

6. The method as in claim 1, wherein the received identities of the multiple operating systems indicate operating systems executable by the hardware type assigned to the mobile communication device.

7. The method as in claim 1 further comprising:
at the mobile communication device:
receiving selection of a first operating system of the multiple operating systems;
receiving the first operating system over the wireless communication link; and
installing the received first operating system onto the mobile communication device.

8. The method as in claim 1 further comprising:
at the mobile communication device:
receiving selection of a first operating system from the received identities of the multiple operating systems; and
retrieving a download of the first operating system.

9. The method as in claim 8 further comprising:
installing the first operating system onto the mobile communication device.

10. A method comprising:
    at a mobile communication device:
    i) establishing a wireless communication link supporting connectivity between the mobile communication device and a management entity;
    ii) communicating attributes of the mobile communication device over the wireless communication link to the management entity; and
    iii) based on the attributes, receiving identities of multiple operating systems available for retrieval and installation onto the mobile communication device;
    the method further comprising:
    receiving selection of a first operating system of the multiple operating systems available for retrieval and installation onto the mobile communication device; and
    subsequent to installing the first operating system on the mobile communication device via communications received over the wireless communication link, scanning for presence of wireless networks supported by the first operating system installed on the mobile communication device.

11. The method as in claim 10, wherein the scanning for the presence of wireless networks results in the mobile communication device detecting identities of multiple different wireless network service providers supporting the first operating system.

12. The method as in claim 11 further comprising:
at the mobile communication device: i) receiving selection of a first wireless network service provider amongst the multiple different wireless network service providers, and ii) receiving configuration information over the wireless communication link, the received configuration information supporting wireless connectivity between the mobile communication device and wireless access points operated by the first wireless network service provider.

13. The method as in claim 12, wherein the received configuration information includes subscriber identity information for installation on the mobile communication device, the method further comprising:
installing the subscriber identity information on the mobile communication device, the installation of the subscriber identity information on the mobile communication device supporting wireless connections of the mobile communication device to the wireless access points operated by the first wireless network service provider.

14. The method as in claim 12, wherein the received configuration information includes antenna settings for application to antenna hardware of the mobile communication device, installation of the antenna settings on the mobile communication device supporting wireless connections of the antenna hardware of the mobile communication device to the wireless access points operated by the first wireless network service provider.

15. A system comprising:
communication management hardware disposed in a mobile communication device, the communication management hardware operative to:
in response to detecting absence of an operating system installed on the mobile communication device:
i) establish a wireless communication link supporting connectivity between the mobile communication device and a management entity;
ii) communicate attributes of the mobile communication device over the wireless communication link to the management entity; and
iii) based on the attributes, receive identities of multiple operating systems available for retrieval and installation onto the mobile communication device;
wherein the communication management hardware is further operative to;
receive selection of a first operating system of the multiple operating systems available for retrieval and installation onto the mobile communication device; and
subsequent to installing the first operating system on the mobile communication device via communications received over the wireless communication link, scan for presence of wireless networks supported by the first operating system installed on the mobile communication device.

16. The system as in claim 15, wherein the communication management hardware is further operative to:
display the received identities on a display screen of the mobile communication device for selection by a user of the mobile communication device.

17. The system as in claim 15, wherein the communication management hardware is further operative to:
in response to selection of a first operating system from the received identities of the multiple operating systems, communicate an identity of the first operating system from the mobile communication device over the wireless communication link to the management entity; and
in response to communicating the identity of the first operating system to the management entity: i) at the mobile communication device, receive a download of the first operating system over the wireless communication link, and ii) install the first operating system onto the mobile communication device.

18. The system as in claim 15, wherein the scan for the presence of wireless networks results in detection, by the mobile communication device, of identities of multiple different wireless network service providers supporting the first operating system.

19. The system as in claim 18, wherein the communication management hardware is further operative to:
i) receive selection of a first wireless network service provider amongst the multiple different wireless network service providers, and ii) receive configuration information over the wireless communication link, the received configuration information supporting wireless connectivity between the mobile communication device and wireless access points operated by the first wireless network service provider.

20. The system as in claim 19, wherein the received configuration information includes subscriber identity information for installation on the mobile communication device, installation of the subscriber identity information on the mobile communication device supporting wireless connections of the mobile communication device to the wireless access points operated by the first wireless network service provider.

21. The system as in claim 19, wherein the configuration information includes antenna settings for application to antenna hardware of the mobile communication device, installation of the antenna settings supporting wireless connections of the antenna hardware of the mobile communication device to the wireless access points operated by the first wireless network service provider.

22. The system as in claim 15, wherein the communication management hardware is further operative to:
subsequent to selection of a first operating system from the identities and installation of the first operating system onto the mobile communication device, receive a first command from a user of the mobile communication device, the first command indicating to remove the first operating system from the mobile communication device; and
in response to receiving the first command, remove the first operating system from the mobile communication device.

23. The system as in claim 15, wherein the communication management hardware is further operative to:
in response to selection of a second operating system from the identities of multiple operating systems: i) receive a download of the second operating system at the mobile communication device, and ii) install the second operating system onto the mobile communication device.

24. Computer-readable storage hardware having instructions stored thereon, the instructions, when carried out by computer processor hardware, cause the computer processor hardware to:
establish a wireless communication link supporting connectivity between a mobile communication device and a remote management entity;
communicate attributes of the mobile communication device over the wireless communication link to the remote management entity in response to detecting absence of any operating system being installed on the mobile communication device, the attributes indicating a hardware type assigned to the mobile communication device; and
based on the attributes, receive identities of multiple operating systems available for retrieval and installation onto the mobile communication device.

25. A method comprising:
at a mobile communication device:
i) establishing a wireless communication link supporting connectivity between the mobile communication device and a management entity;
ii) communicating attributes of the mobile communication device over the wireless communication link to the management entity; and
iii) based on the attributes, receiving identities of multiple operating systems available for retrieval and installation onto the mobile communication device;
the method further comprising: at the mobile communication device, during a condition in which no operating system has been installed on the mobile communication device: i) executing a startup program, and ii) providing notification on a display screen of the mobile communication device, the notification indicating that the mobile communication device can be configured with an operating system.

26. A method comprising:
at a mobile communication device:
  i) establishing a wireless communication link supporting connectivity between the mobile communication device and a management entity;
  ii) communicating attributes of the mobile communication device over the wireless communication link to the management entity; and
  iii) based on the attributes, receiving identities of multiple operating systems available for retrieval and installation onto the mobile communication device;
  iv) receiving selection of a first operating system of the multiple operating systems;
  v) receiving the first operating system over the wireless communication link; and
  vi) installing the received first operating system onto the mobile communication device;
  the method further comprising: in addition to receiving the first operating system, receiving a notification indicating identities of multiple different wireless network service providers supporting the first operating system.

27. The method as in claim 26 further comprising:
at the mobile communication device:
  receiving selection of a first wireless network service provider amongst the multiple different wireless network service providers; and
  in response to receiving the selection of the first wireless network service provider amongst the multiple different wireless network service providers, retrieving antenna settings for application to antenna hardware of the mobile communication device.

28. The method as in claim 27, wherein retrieving the antenna settings includes:
  establishing wireless connectivity between the mobile communication device and a wireless network supported by the first wireless network service provider; and
  communicating from the mobile communication device over the established wireless connectivity to retrieve the antenna settings.

29. The method as in claim 28 further comprising:
  installing the retrieved antenna settings on the mobile communication device, the installed antenna settings supporting wireless connections of the antenna hardware of the mobile communication device to wireless access points operated by the first wireless network service provider.

* * * * *

UNITED STATES PATENT AND TRADEMARK OFFICE
CERTIFICATE OF CORRECTION

PATENT NO. : 12,388,707 B2
APPLICATION NO. : 18/229800
DATED : August 12, 2025
INVENTOR(S) : Lakhbir Singh Page 1 of 1

It is certified that error appears in the above-identified patent and that said Letters Patent is hereby corrected as shown below:

In the Claims

Column 19 Claim 15, Line 18, replace "to;" with --to:--

Signed and Sealed this
Twenty-eighth Day of October, 2025

John A. Squires
*Director of the United States Patent and Trademark Office*